(12) United States Patent
Goldhardt et al.

(10) Patent No.: US 11,111,168 B1
(45) Date of Patent: Sep. 7, 2021

(54) TANK WITH MEMBRANE COVER AND DRAFT TUBE MIXER

(71) Applicant: Ovivo Inc., Montreal (CA)

(72) Inventors: James Goldhardt, Layton, UT (US); Haydon Christiansen, Sandy, UT (US); Jacob Harwood, North Salt Lake, UT (US)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 17/191,536

(22) Filed: Mar. 3, 2021

Related U.S. Application Data (60) Provisional application No. 63/006,487, filed on Apr. 7, 2020.

(51) Int. Cl.
| | | |
|---|---|---|
| *C02F 11/04* | (2006.01) | |
| *C02F 3/28* | (2006.01) | |
| *C02F 103/00* | (2006.01) | |

(52) U.S. Cl.
CPC ............ *C02F 11/04* (2013.01); *C02F 3/2853* (2013.01); *C02F 3/2873* (2013.01); *C02F 2103/005* (2013.01)

(58) Field of Classification Search
CPC ...... C02F 11/04; C02F 3/2853; C02F 3/2873; C02F 2103/005
USPC ............................... 95/266; 210/603, DIG. 9
See application file for complete search history.

(56) References Cited

U.S. PATENT DOCUMENTS

| | | | | | |
|---|---|---|---|---|---|
| 2,538,412 | A | * | 1/1951 | Cecil | C02F 3/2873 210/603 |
| 2,680,602 | A | * | 6/1954 | Nelson | C02F 3/2873 366/343 |
| 2,768,137 | A | * | 10/1956 | Schlenz | C02F 3/28 210/603 |
| 3,288,295 | A | * | 11/1966 | Kelly | C02F 3/28 210/194 |
| 4,293,412 | A | * | 10/1981 | Lescure | C12M 27/02 210/179 |
| 4,437,987 | A | * | 3/1984 | Thornton | C02F 3/28 210/137 |
| 4,749,480 | A | * | 6/1988 | Luhrs | C12M 23/36 210/188 |
| 5,942,116 | A | * | 8/1999 | Clark | C02F 3/2873 210/603 |
| 10,829,788 | B2 | * | 11/2020 | Josse | C12M 29/18 |
| 2002/0070152 | A1 | * | 6/2002 | Charbonneau | C12M 41/40 210/170.08 |

FOREIGN PATENT DOCUMENTS

| | | | |
|---|---|---|---|
| DE | 3138452 A1 | * | 6/1983 |
| GB | 281541 | * | 12/1927 |

* cited by examiner

*Primary Examiner* — Fred Prince
(74) *Attorney, Agent, or Firm* — Thomas M. Freiburger (57) ABSTRACT

In a municipal sewage treatment system, a biological process tank, typically an anaerobic digestion process, has a flexible, inflated membrane cover. At least one draft tube mixer is installed on the tank, interrupting the gas supported cover with a platform having a flat base and may have upwardly extending sides that generally follow the contour of the inflated cover. The draft tube is connected to the platform and preferably supported on the floor of the tank. The mixer mechanism can be lifted out of the draft tube without escape of gas from the inflated cover.

4 Claims, 7 Drawing Sheets

ISOMETRIC VIEW
EIMIX MIXER WITH DRAFT TUBE AND PLATFORM

TANK WITH MEMBRANE COVER AND DRAFT TUBE MIXER

BACKGROUND OF THE INVENTION

This application claims benefit of provisional application Ser. No. 63/006,487, filed Apr. 7, 2020.

This invention relates to sewage treatment systems, and particularly to treatment process tanks fitted with a flexible, gas supported membrane cover. The invention includes draft tube mixers fitted to the tank and cover in an efficient manner, particularly for anaerobic digestion.

In the municipal wastewater treatment field, anaerobic tank covers are needed to close the tank to create an anaerobic condition, and to store the gas generated from the process. Essentially three ways are available to cover an anaerobic digestion tank: a concrete cover, a steel cover, and a membrane gasholder cover. When a tank has a membrane gasholder cover, options for mixing systems are limited to an external type, that penetrates through the tank wall, or an internal nozzle type mixer, located on the tank floor. Both of these avoid interference with the membrane gasholder cover.

Anaerobic digestion is highly dependent on effective sludge mixing. When tank contents are inadequately mixed, stratification occurs and the volume is not properly utilized. The function of the sludge mixer is to mix and circulate the sludge contents of the digester via a impeller in order to minimize accumulation, distribute heat and keep the solids in suspension in the liquid.

In Europe there have been tanks covered with membrane gasholders, and fitted with an integrated mixing system. The mixers were not draft tube mixers, and the installation required a flat platform, generally trapezoid shaped but with an outer edge following the tank curvature, on which the mixing equipment was installed. Installation of the platform required that the gasholder cover be changed in shape, indented and reshaped at each platform. The European gasholder covers with mixers have typically been used for agricultural tanks rather than anaerobic digesters.

SUMMARY OF THE INVENTION

In the current invention a particular type of mixing system, a draft tube mixer, is mounted at the top of the inside edge of the tank wall. This greatly simplifies installation and maintenance, and also avoids the need to drain the tank for access to nozzles as with a nozzle mixing system, or cutting holes in the side of the tank for other mixing systems. In addition, the platform that is part of the installation allows access into the tank with a manhole, if desired. The current typical membrane gasholder cover prevents this unless a section of the cover is detached and pulled back.

The installation according to the invention also allows for other instruments to be mounted via the platform, instruments that cannot be used with a traditional membrane gasholder cover. These include a sample port, a liquid level sensor, a view port and other supporting equipment.

In particular, the draft tube mixer used in the invention can be an EIMIX mechanical sludge mixer manufactured by Ovivo Inc.

Another aspect of the invention is remote monitoring of digester status including mixing speed, which can be sent wirelessly from a sensor and transmitter on the sludge mixer. A remote monitoring system such as OVIVO WATER EXPERT™ can be used, so as to monitor other variables including gas production, liquid level and gas pressure.

The system of the invention efficiently integrates process sludge mixing with a membrane gas storage cover, in a cost-efficient and low-maintenance assembly. The draft tube mixer mechanism as installed provides access for operators outside of the gas cover, and the structure need not have air/gas exchanges because its upper end is not in a confined space. The gasholder and the mixer mechanism are integrated to optimize serviceability without requiring entry into the covered space, while saving installation cost.

DESCRIPTION OF PREFERRED EMBODIMENTS

Figure 1:
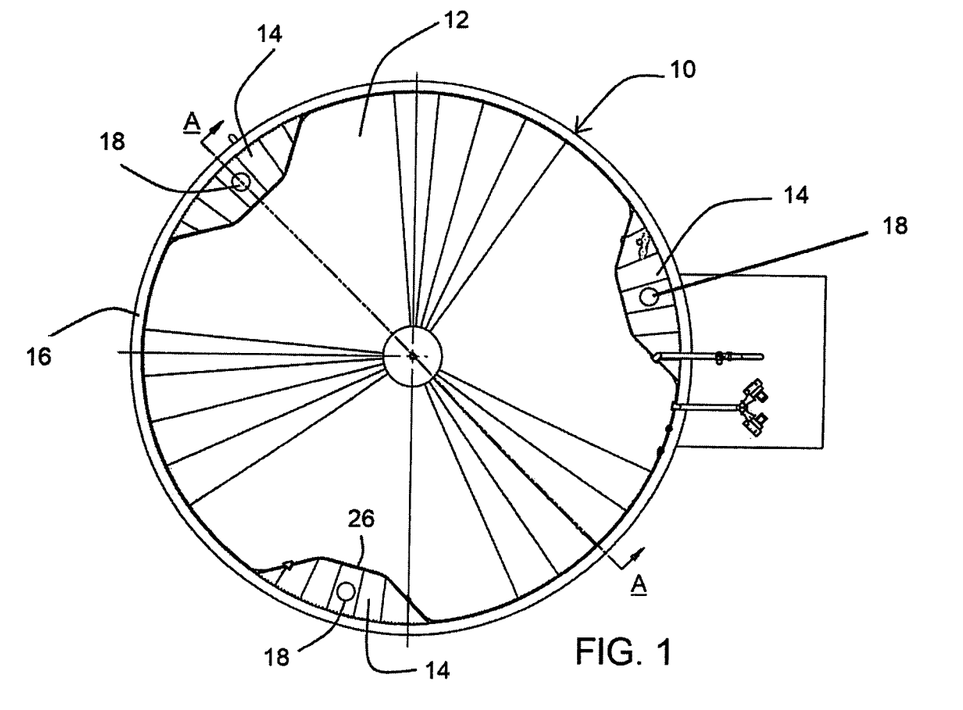
FIGS. 1 and 2 are plan and sectional elevation views showing a digester, typically an anaerobic digester, with a flexible, gas supported membrane cover, and including a sludge mixer in accordance with the invention.
Figure 2:
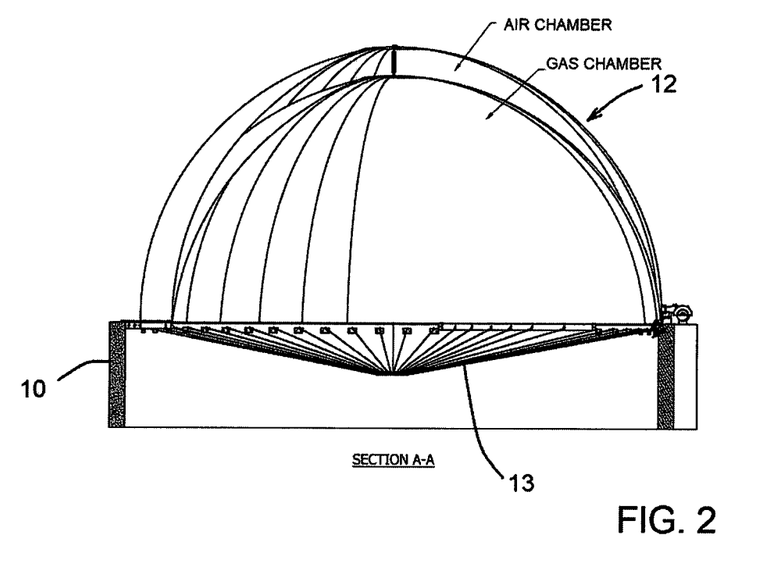

FIG. 1 shows a wastewater treatment tank, typically a digester tank and preferably an anaerobic digester tank 10, in plan view. The tank has a cover 12, which is a gas-supported membrane cover, to support the anaerobic condition in the tank, as well as to store gas for harvest. The outer membrane is supported by air from blowers; the inner membrane is supported by gas digestion. An elevation view of the tank 10 with cover 12 is seen in FIG. 2. Hanging down below the tank rim is a net 13 formed of cables, providing a catch net used for maintenance.

At several locations around the periphery of the tank 10, as shown in FIG. 1, are platforms 14 attached to the tank rim 16 and wall 10 and which interrupt the gasholder cover 12 at these locations. Three of the platforms are shown in FIG. 1. As will be seen below, a draft tube mixer is to be secured to each platform 14, such that it extends down into the tank and sludge within the tank, and FIG. 1 indicates a penetration of each platform at 18.

It is an important feature of the invention that the draft tube mixer and its platform are essentially integrated with the gasholder cover 12, and in one embodiment of the invention changing the contour of the gasholder cover membrane only minimally.

Figure 3:
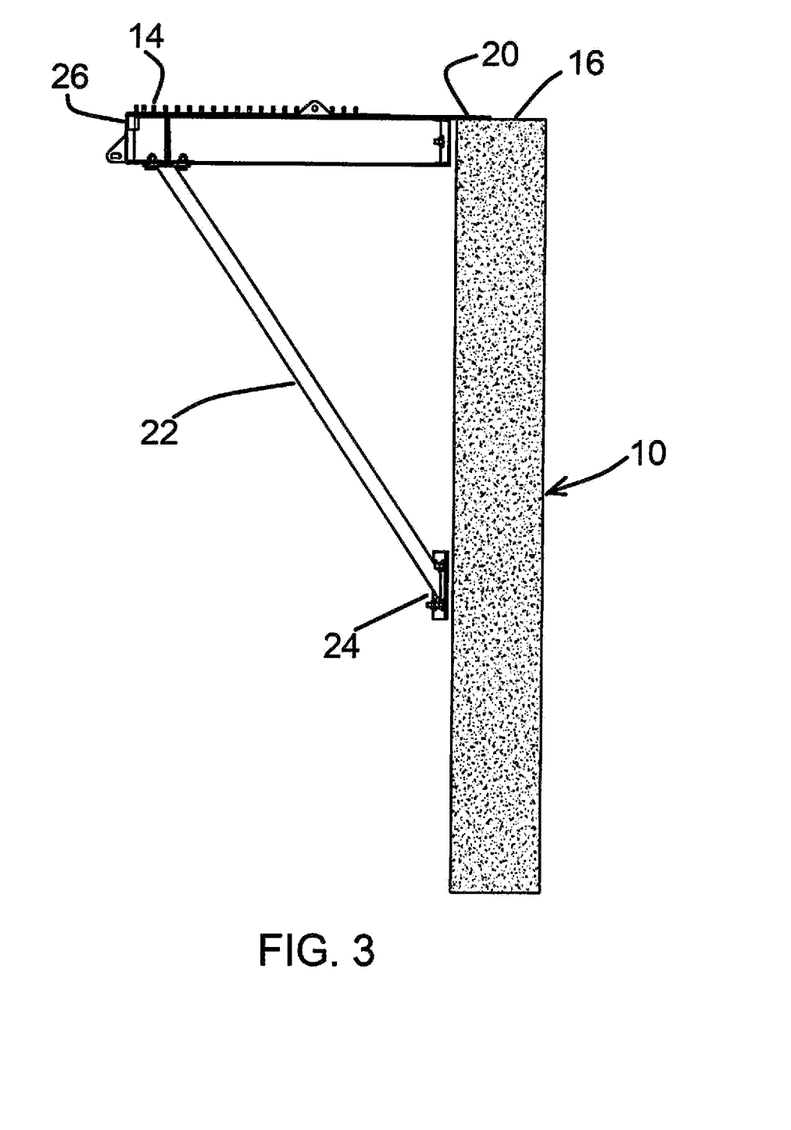
FIG. 3 is a side elevation view, partially in section, showing a platform mounted on the inside rim and wall of the tank.
Figure 4:
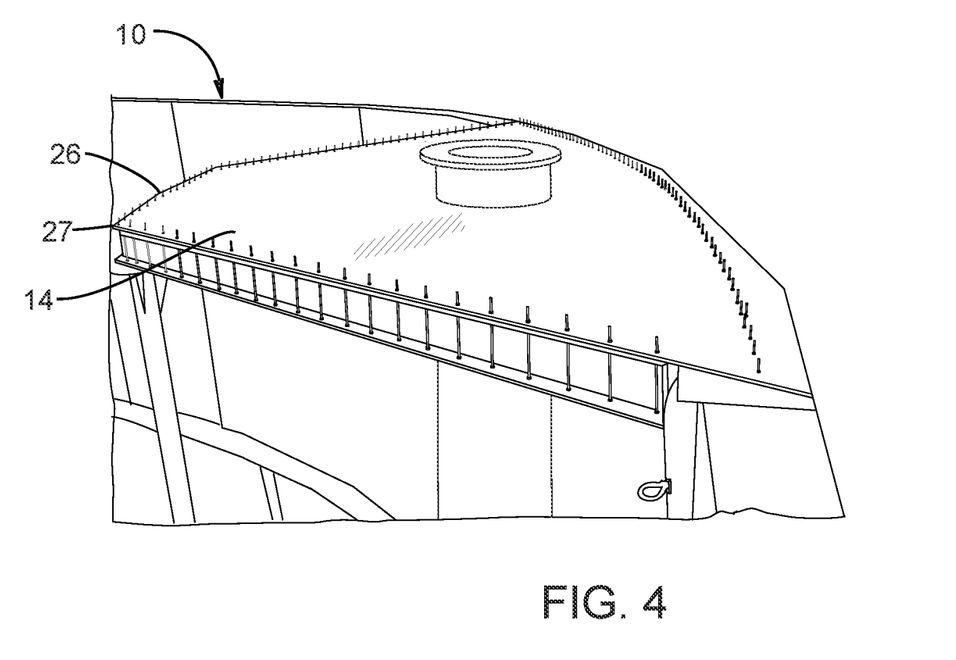
FIG. 4 is a perspective view showing the platform.

FIG. 3 shows one of the platforms 14 as secured to the wall of the tank 10. The platform is secured, in a gas-tight manner at 20 to the rim 16 of the tank, and is supported by two or more struts 22 extending to a connection 24 with the interior of the tank wall 10. As seen in FIG. 4, the platform 14 is preferably of steel, bolted to the concrete wall and thus becoming essentially integral with the tank wall. Depending on the number of mixers needed, one, two, three or more platforms can be provided around the circumference of the tank. As an example, typical dimensions of the generally trapezoidal platform 14, for a digester tank of 70-foot diameter, can be about six to seven feet radially inward from the outer side of the wall, occupying about 35° (or 30° to 40°) of the wall's circumference, and with an inner, straight edge 26 of about seven to eight feet in length. The transitions at each end 27 of the straight edge 26 are not hard angles, and may be defined by a radius of about four feet.

Figure 5:
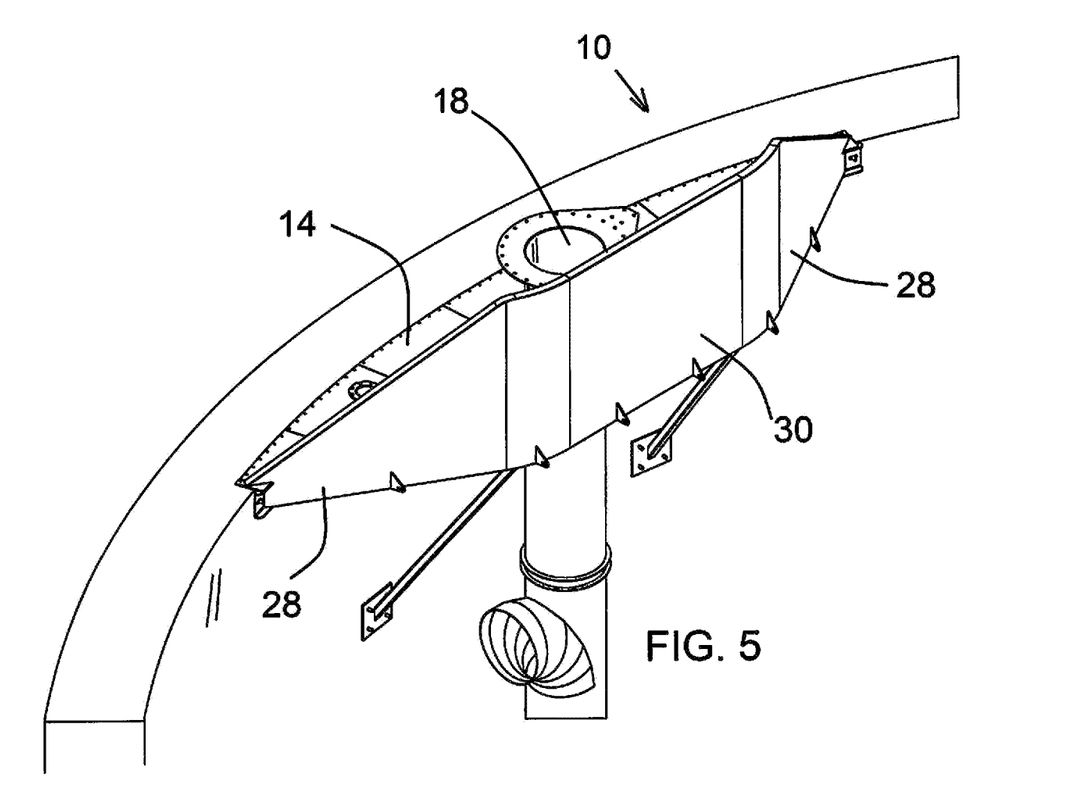
FIG. 5 is a perspective view showing the platform with upwardly extending side walls to meet the contour of the gasholder cover.

FIG. 5 shows additional preferred details for the platform 14. In a preferred embodiment the platform includes upwardly extending, preferably vertical side and inward walls 28 and 30, the side walls being approximately triangular and generally following the inclination of the gasholder cover when the cover is installed and inflated.

Figure 6:
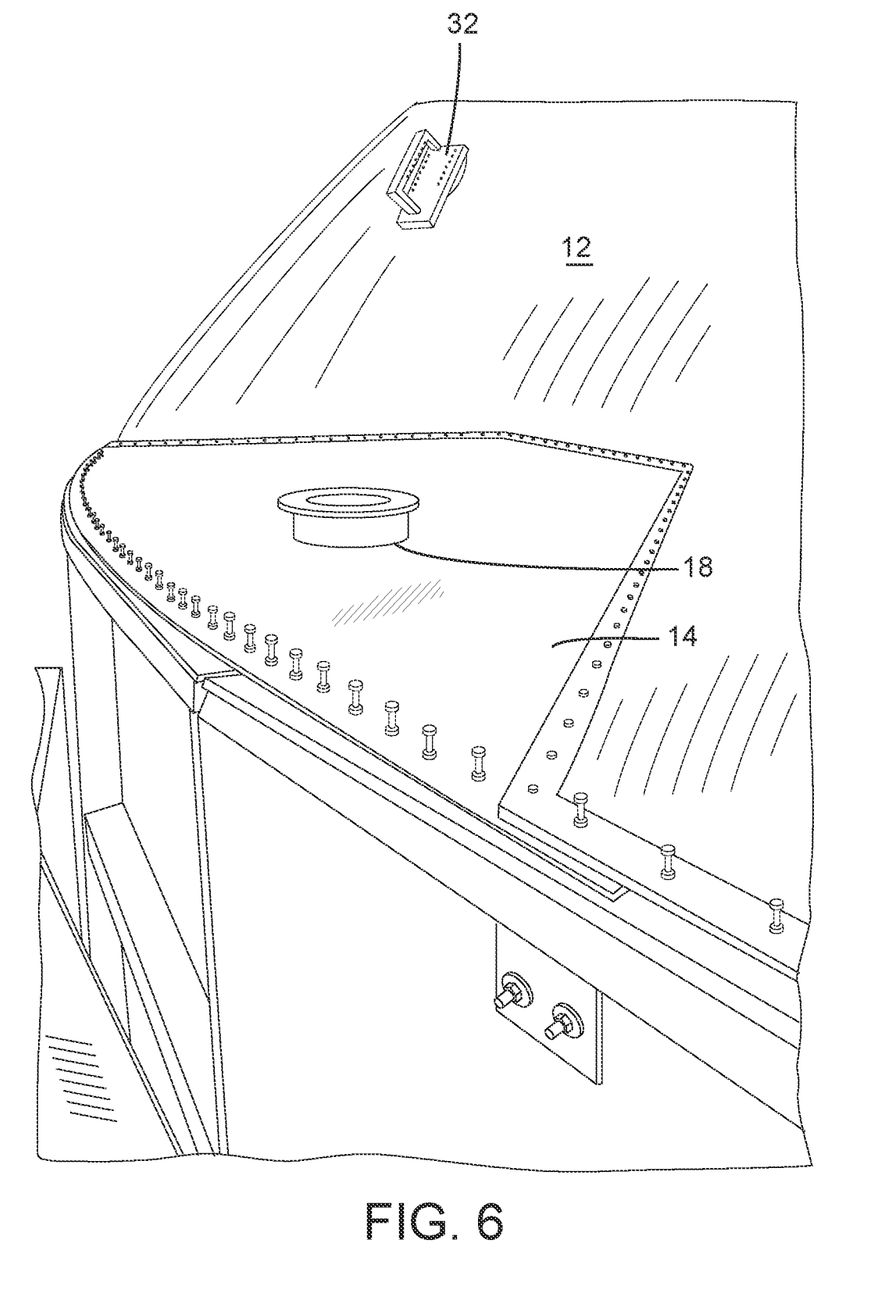
FIG. 6 is a perspective view showing an example of a completed installation, in a second embodiment.

FIG. 6 shows another embodiment wherein a flat, preferably horizontal platform 14 is included, as in FIGS. 3 to 5, but without upstanding side and rear walls. Again the mixer is not shown. In this case the gas cover 12 does not closely follow the partial-spherical shape or dome shape, but is contoured differently at the platform, accommodating the inward horizontal extension of the platform into what would otherwise be volume contained under the cover. Otherwise, this embodiment is similar to what is described above, with an opening structure in the platform at 18 for draft tube mixer equipment (not shown) as described below. FIG. 6 shows a pressure sensor and relief valve 32 for regulating pressure inside the membrane, located near the platform 14 for ease of maintenance.

Figure 7:
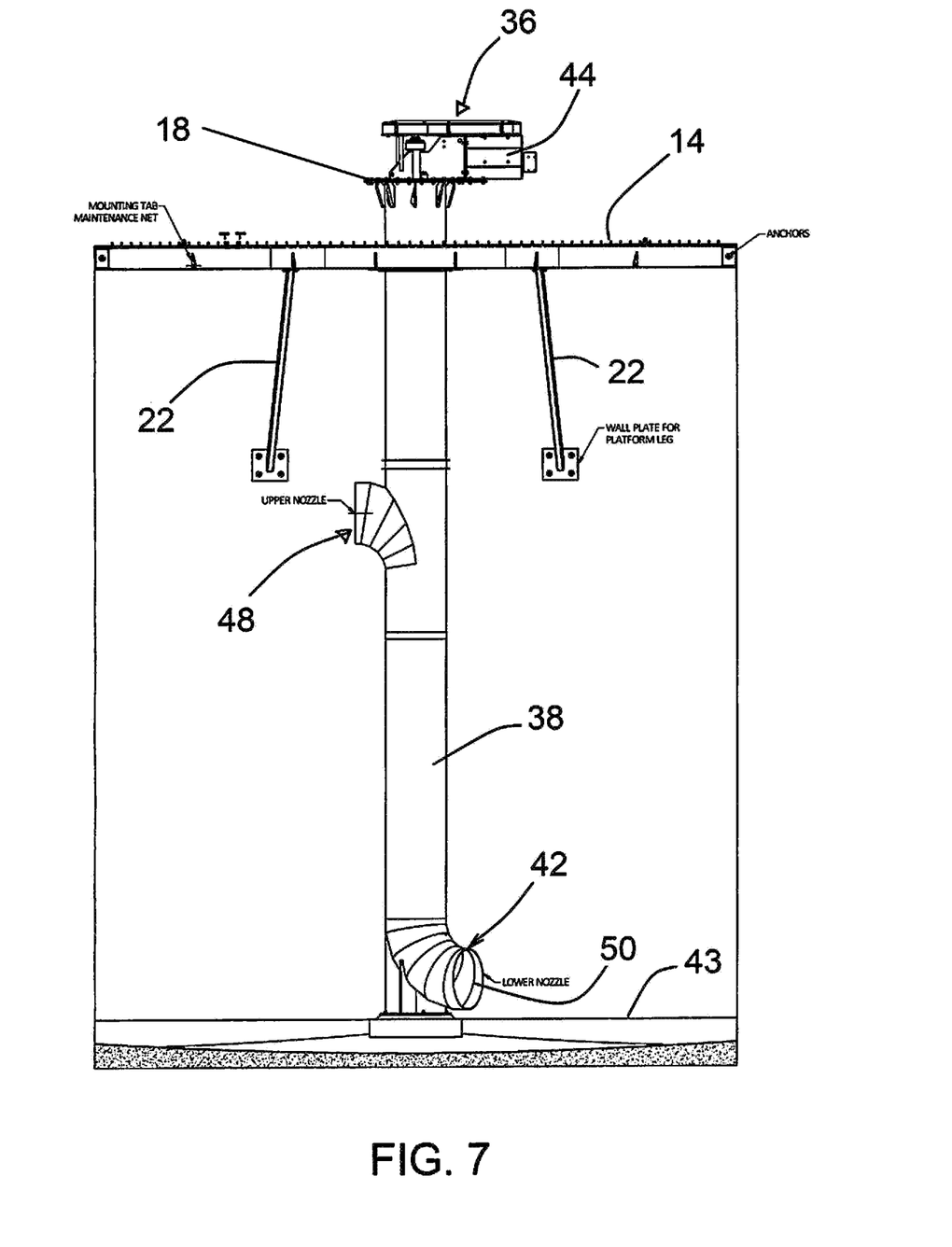
FIG. 7 is an elevation view showing the platform with a draft tube mixer installed and extending into the tank.
Figure 8:
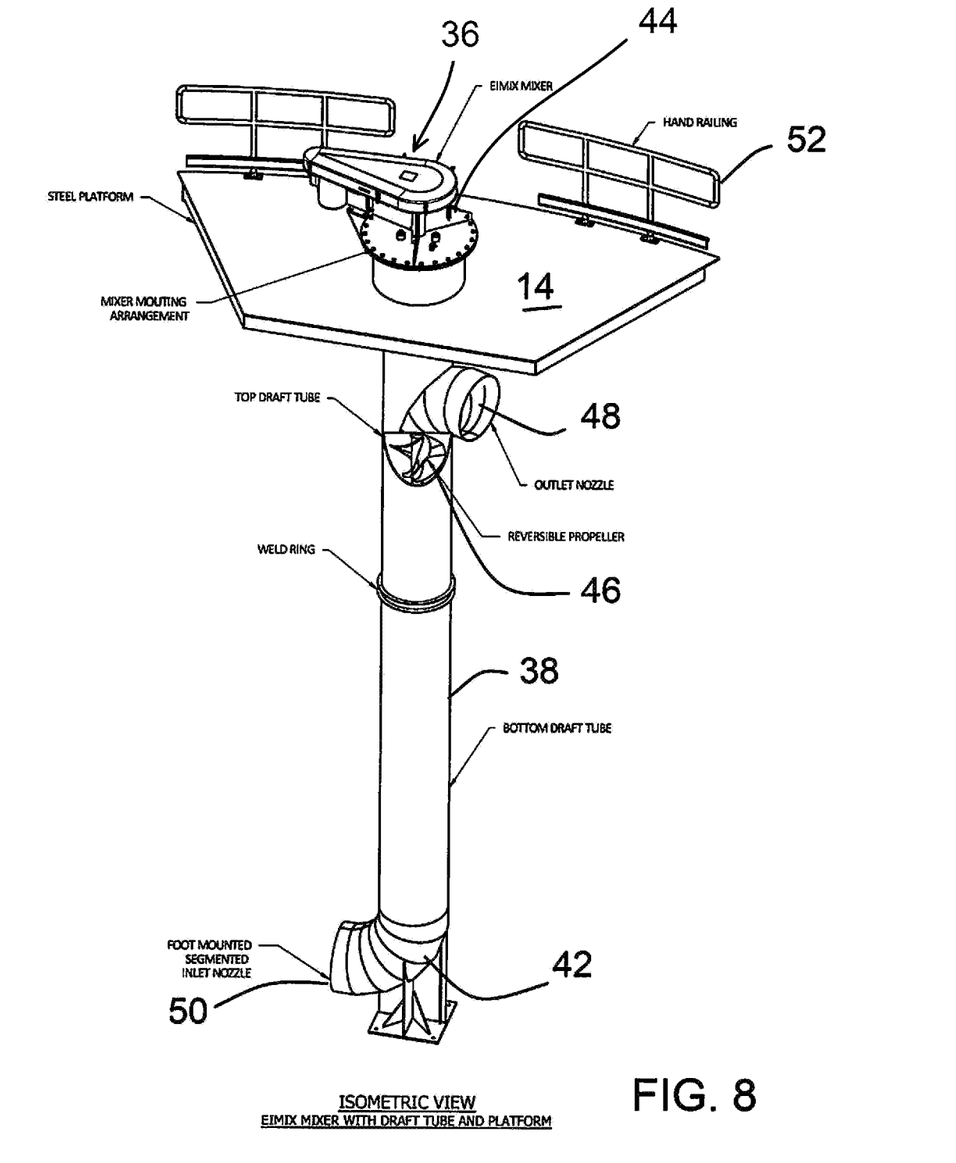
FIG. 8 is a perspective view showing the apparatus of FIG. 7.

FIG. 7 is an elevation view from inside the tank. A draft tube mixer assembly is shown at 36, having been installed down through the platform's hole 18, shown in FIG. 1. The draft tube mixer assembly 36 is thus called because of an elongated draft tube 38 that extends down into the tank, preferably to the bottom. The tube is installed permanently, both to the platform 14 and to the tank bottom, or optionally to the wall at the bottom. Preferably the bottom end 42 of the draft tube is mounted directly to the bottom of the tank, to the floor 43 of the tank. The draft tube mixer mechanism to be fully supported by the draft tube, which is supported from the floor and to some extent from the platform. The mixer mechanism 44 is secured at the top end of the draft tube and includes a rotational shaft with an impeller for moving the sludge, as indicated in FIG. 8 at 46. FIG. 7 shows an upper sludge nozzle 48 on the side of the draft tube, at a raised position in the tank, and a lower sludge nozzle 50 for movement of the sludge. The impeller 46 can be operated to move sludge in either direction, and can be reversed periodically so as to draw sludge in or out at 48 and 50. The nozzle 48 and impeller 46 may be lower than shown in FIG. 8.

FIG. 8 also shows a hand railing 52 at the outer edge of the platform 14, and better illustrates the mixer mechanism 44, with motor and gearing.

With the draft tube mixing system mounted at the top of the tank, on the platform, and on the draft tube, this provides for easy access for maintenance of the mixing mechanism, and, importantly, allows for removal of the mixer mechanism without depressurizing or taking the digester tank off-line. The liquid seal formed by water in the draft tube prevents the pressurized gas from escaping. Further, the draft tube mixing system combined with a membrane gasholder allows for communication or interaction by a control system (i.e. overpressure situation would shut the mixers down, mixer speed can be adjusted to help control gas production (high or low), high foam signal would reverse the mixing direction, etc.). The mixing system is an integral part of the anaerobic digestion process, and this combined system allows for operation of the cover to interact with operation of the mixers.

Some primary advantages of the invention include that the system:

Allows for a mixing system to be mounted on the top of the tank wall, offering a better mixing system and minimizing maintenance (due to not having to drain the tank to access nozzles as with a nozzle mixing system or cutting holes in the side of he tank for other mixing systems).

Allows for access into the tank with a manhole, if desired, as the current membrane gasholder prevents this from occurring unless a section of the cover is removed and pulled back.

Allows for other instruments to be mounted that cannot be used with a traditional membrane gasholder cover (such as a sample port, a liquid level sensor, view port, etc.).

Allows for an integrated system with mixing and gas storage cover utilizing controls to optimize the process and system.

In a modified embodiment, the system of the invention can be used with a three-membrane gasholder cover, in order to minimize heat loss from the digester tank.

As mentioned above, remote monitoring preferably is used in connection with the invention. The mixer 36 can have a speed sensor, which via a transmission (e.g. WiFi and Internet) sends out a signal for remote monitoring. The pressure valve 32 can also include a sensor/transmitter, with both air pressure and gas pressure data. Further, liquid level can be monitored and transmitted. This can be via an additional flange connection on the platform 14 used for mounting a sample tube and liquid level sensor.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A wastewater treatment system including an anaerobic digester, the digester having a tank with a rim, comprising:

a membrane gas cover on top of the tank and covering the tank, connected to and sealed to the tank rim to be inflated and contain gas therein, an interruption in the gas cover at least at one location around the periphery of the tank, with a platform secured to the tank rim at the interruption, the platform including a substantially horizontal surface, the gas cover at said interruption having edges on each side of the interruption connected in substantially sealed relationship to the platform, and a draft tube mixer secured to the platform and extending down through an opening in said horizontal surface, the draft tube mixer including a draft tube secured to the platform and to the tank, fixedly secured therein, and a mixing mechanism having a shaft and an impeller removably fitted in the draft tube, with the impeller and shaft extending down into the draft tube and a drive mechanism connected to the shaft and secured at the top of the draft tube, the draft tube having openings above and below the impeller, for drawing in sludge from within the tank and expelling the sludge in a desired direction, thus circulating and mixing the sludge in the tank.

2. The system of claim 1, wherein the platform includes walls extending up from the horizontal surface, including side walls generally triangular in shape so as to follow the general shape and contour of the inflated gas cover, whereby a generally hemispherical shape of the inflated gas cover is maintained, without substantial warping or distortion at said interruption.

3. The system of claim 1, wherein said substantially horizontal surface of the platform is essentially trapezoid-shaped but with an arcuate radially outer edge following the tank rim, with the membrane gas cover at said interruption being secured to the platform at edges of the substantially horizontal surface, such that the membrane gas cover is warped inwardly at said interruption.

4. The system of claim 1, wherein said substantially horizontal surface of the platform has a radially outer edge of arcuate shape following the tank rim, and an inner periphery secured to the membrane gas cover through the length of said interruption, such that the membrane gas cover is warped inwardly at said interruption.

* * * * *